United States Patent [19]
Szczepanowski et al.

[11] Patent Number: 5,940,410
[45] Date of Patent: Aug. 17, 1999

[54] METHOD OF TRANSMITTING DATA RELIABLY OVER N NORMAL CHANNELS, AND OVER AT LEAST ONE BACK-UP CHANNEL, AND A TRANSMIT END STATION, A RECEIVE END STATION, AND A RELAY STATION CORRESPONDING TO THE METHOD

[75] Inventors: Serge Szczepanowski, Vaureal; Patrick Janer, Nanterre Cedex; Xavier Roubinet, Rueil Malmaison, all of France

[73] Assignee: Alcatel Telspace, Nanterre Cedex, France

[21] Appl. No.: 08/790,019

[22] Filed: Jan. 28, 1997

[30] Foreign Application Priority Data

Jan. 29, 1996 [FR] France .................................. 96 00993

[51] Int. Cl.$^6$ .............................. H04J 3/04; G01R 31/08; H04L 1/00
[52] U.S. Cl. ...................... 370/535; 370/219; 340/825.01
[58] Field of Search ..................... 370/216, 225, 370/227, 228; 340/825.01, 825.03, 826, 827; 395/181, 182.01, 182.02, 438; 375/358; 341/140, 141

[56] References Cited

U.S. PATENT DOCUMENTS

| | | | |
|---|---|---|---|
| 4,417,348 | 11/1983 | Abbruscato | 340/825.01 |
| 4,471,491 | 9/1984 | Abe et al. | 455/3.1 |
| 4,882,730 | 11/1989 | Shinmyo | 340/825.08 |
| 5,581,542 | 12/1996 | Kato et al. | 370/219 |
| 5,686,917 | 11/1997 | Odom et al. | 370/535 |

*Primary Examiner*—Chi H. Pham
*Assistant Examiner*—Afsar M. Qureshi
*Attorney, Agent, or Firm*—Sughrue, Mion, Zinn, Macpeak & Seas, PLLC

[57] ABSTRACT

The invention concerns a method of transmitting data reliably over N normal channels (3), where $N \geq 1$, and over at least one back-up channel (4), between a transmit end station (1) and a receive end station (2), the data transmitted comprising both traffic data and supervisory data. According to the invention, the following successive steps are performed in said transmit end station (1): the traffic data and the supervisory data applied to each of the N pairs of inputs are multiplexed on a respective one of the N normal channels; then, the multiplexed data from a "backed-up" one of the N normal channels is switched to the back-up channel. The following successive steps are performed in the receive end station (2): the multiplexed data from the back-up channel is interchanged with the multiplexed data from the backed-up normal channel; then the traffic data and the supervisory data on each of the N normal channels are demultiplexed so as to make the data available at a respective one of the N pairs of outputs.

11 Claims, 4 Drawing Sheets

METHOD OF TRANSMITTING DATA RELIABLY OVER N NORMAL CHANNELS, AND OVER AT LEAST ONE BACK-UP CHANNEL, AND A TRANSMIT END STATION, A RECEIVE END STATION, AND A RELAY STATION CORRESPONDING TO THE METHOD

BACKGROUND

The invention relates to transmitting data between end stations, one of which is referred to as a "transmit end station", the other being a "receive end station". The invention is applicable in particular, but not exclusively, to transmitting data by radio.

More precisely, the invention relates to backing up such data transmission by using at least one back-up channel in addition to N normal channels, where $N \geq 1$. Usually, one back-up channel is used for a plurality of normal channels.

It is necessary to make data transmission reliable whenever transmission over the channels might be impaired, such impairment giving rise to transmission errors. For example, in the case of data transmission by radio, transmission over the channels might be impaired because of atmospheric conditions, or because of reflections or fading. In general, transmission is made reliable by using a back-up channel instead of a normal channel (generally, the normal channel that is most impaired).

In this type of data transmission over channels, the data transmitted over each of the N normal channels, and the data transmitted over the back-up channel, generally comprises both traffic data and supervisory data.

Traffic data (also referred to as "payload" data) may, for example, be supplied to the transmit end station in the form of N incoming payload paths. For example, each incoming payload path may have a data rate of 34 Mbit/s.

The supervisory data (also referred to as "service" data) is in particular data relating to the various protocols implemented for the transmission. For example, it is supplied to the transmit end station in the form of N incoming service paths.

Each of the N incoming service paths is associated with a respective one of the N incoming payload paths. The transmit end station thus generally includes N pairs of inputs, each of which comprises a traffic data input and a supervisory data input. The traffic data and the supervisory data applied to the two inputs of the same pair of inputs is transmitted by the transmit end station over one of the N normal channels, and optionally over the back-up channel. In other words, the data from an incoming service path is multiplexed with the data from the associated incoming payload path so as to be transmitted in the same channel in the form of a stream of data frames.

Likewise, the receive end station also generally includes N pairs of outputs, each of which comprises a traffic data output and a supervisory data output. The data available at the respective outputs of the same pair of outputs is traffic data and supervisory data received by the receive end station over the same normal channel, and optionally over the back-up channel.

In the state of the art, for all data transmission systems of the above-described type, making data transmission reliable consists in performing the following successive steps:

in the transmit end station:
the traffic data is switched from a "backed-up" one of the N normal channels to the back-up channel; then
supervisory data is multiplexed with the traffic data on each of the N normal channels;

in the receive end station:
the traffic data and the supervisory data are demultiplexed on each of the N normal channels and on the back-up channel; then
the traffic data from the back-up channel is interchanged with the traffic data from the backed-up normal channel.

That known technique of making data transmission reliable suffers from the drawback of enabling only traffic data to be made reliable, since the data is switched to the back-up channel prior to multiplexing the traffic data with the supervisory data. As a result, to make the supervisory data reliable, it is necessary to implement additional means which are complex and costly.

Furthermore, when the distance between the transmit end station and the receive end station is too great, one or more receive/retransmit relay stations are used. The reliable data transmission then has more than one transmission leg. Each transmission leg is implemented over N normal channel portions, where $N \geq 1$, and over at least one back-up channel portion.

Thus, in the case of radio transmission, each transmission leg corresponds, for example, to a distance of about 50 km. A relay station is then placed every 50 km between the transmit end station and the receive end station.

In the case of such multi-leg transmission, it is always the above-mentioned technique for making data transmission reliable that is implemented in the transmit end station and in the receive end station.

A first known technique for making data transmission reliable, referred to as "full-link interchange" consists in interchanging a normal channel with the back-up channel over the entire transmission link connecting the transmit end station to the receive end station. The entire transmission link, i.e. all of the legs forming said link, is then made reliable as a whole. In other words, all of the successive back-up channel portions (which correspond to the successive legs of the link) serve to back up all of the successive portions of the same normal channel. In this case, the relay stations are used solely for regenerating the multiplexed supervisory data and traffic data in each channel, and optionally for inserting or dropping supervisory data.

That first known technique is simple to implement. Unfortunately, it leads to under-use of multi-leg transmission. Even if a single portion (i.e. a single leg) of a normal channel is impaired, all of the portions of said normal channel are nevertheless backed up. In other words, certain portions of the back-up channel are used to back up portions of a normal channel that are not impaired, whereas portions of another normal channel might be impaired but are not backed up.

In order to make optimum use of multi-leg transmission, it is necessary to back up the legs independently from one another. For this purpose, a second known technique for making data transmission reliable, referred to as "leg-by-leg interchange" consists in interchanging that normal channel portion which is most impaired on each leg with the back-up channel of said leg.

The advantage of a link with leg-by-leg interchange is that it offers better availability. Unfortunately, implementing it in all of the relay stations involves a large number of processing operations and therefore requires a large number of cards.

In the state of the art, there are two known manners of implementing such leg-by-leg interchange.

The first known manner consists in using two terminals back-to-back in each relay station with baseband interchange. That first solution, generally implemented in transmission of the N+1 type (N normal channels and 1 back-up channel) suffers from the drawback of making the following necessary in each relay station:

return to baseband (generally by aligning);

demultiplexing the streams of frames, a payload path (for traffic data) and a service path (for supervisory data) being multiplexed on each of said streams;

separate and error-free interchange of the demultiplexed payload paths and service paths;

aligning the payload paths and the service paths; and multiplexing the aligned payload paths and service paths so that they can be transmitted.

The second known manner of implementing leg-by-leg interchange consists in using "diversity" cards which interchange streams of frames. The second solution, generally implemented in transmission of the 1+1 type, suffers from the drawback of being difficult to apply to transmission of the N'+1 type, where N'>1. The two streams of frames to be interchanged in each relay station (i.e. that from the normal channel and that from the back-up channel) are aligned using different clocks and independent time bases. In other words, the normal channel and the back-up channel are subjected to respective quasi-synchronous and independent treatments. As a result, the interchange performed in each relay station gives rise to errors, or even synchronization loss.

SUMMARY OF THE INVENTION

A particular object of the invention is to mitigate the various drawbacks of the state of the art.

More precisely, an object of the present invention is to provide a method of transmitting data reliably over N normal channels, where $N \geq 1$, and over at least one back-up channel, between a transmit end station and a receive end station, which method enables the equipment used to implement it to be less complex than that used for the above-discussed known methods.

A further object of the invention is to provide such a method that is suitable for being implemented both with transmission of the 1+1 type and with transmission of the N'+1 type, where N'>1.

An additional object of the invention is to provide such a method that, in the case of multi-leg transmission, enables optimum use to be made of all the legs, while requiring equipment that is simple.

Another object of the invention is to provide such a method that makes it simple to transmit reliably both traffic data and supervisory data.

The invention achieves these objects and others that appear below by providing a method of transmitting data reliably over N normal channels, where $N \geq 1$, and over at least one back-up channel, between a transmit end station and a receive end station, the data transmitted comprising both traffic data and supervisory data, said transmit end station being provided with N pairs of inputs, each pair comprising an input for traffic data and an input for supervisory data, the traffic data and the supervisory data applied to the respective inputs of the same pair of inputs being transmitted by the transmit end station over the same normal channel and optionally over the back-up channel said receive end station being provided with N pairs of outputs, each pair comprising an output for traffic data and an output for supervisory data, the data available at the respective outputs of the same pair of outputs being traffic data and supervisory data received by the receive end station over the same normal channel and optionally over the back-up channel;

said method being characterized in that the following successive steps are performed in said transmit end station:

the traffic data and the supervisory data applied to each of the N pairs of inputs is multiplexed on a respective one of the N normal channels; and the multiplexed data from a "backed-up" one of the N normal channels is switched to the back-up channel;

and in that the following successive steps are performed in the receive end station:

the multiplexed data from the back-up channel is interchanged with the multiplexed data from the backed-up normal channel; and the traffic data and the supervisory data on each of the N normal channels is demultiplexed so as to make it available at a respective one of said N pairs of outputs.

Thus, the general principle of the invention consists in switching (on transmission) and interchanging (on reception) not only the traffic data (payload paths) as in the methods known in the state of the art, but rather the traffic data (payload paths) multiplexed with the supervisory data (service paths). In other words, the switching operation (on transmission) and the interchange operation (on reception) are performed on the multiplexed data of the stream of frames.

The general principle of the invention may be implemented whether there is only one normal channel or a plurality of normal channels (i.e. with transmission of the 1+1 type or of the N'+1 type).

Furthermore, since the multiplexing is performed on transmission, prior to switching, all of the data (the traffic data and the supervisory data) is made reliable with a single switching member. In the same way, on reception, since the demultiplexing is performed after the interchange, a single interchange member is needed to enable all of the data to be received reliably.

It should also be noted that the method of the invention enables the channels to be interchanged in error-free manner. The same multiplexed data is transmitted over the backed-up normal channel and over the back-up channel, without passing back through baseband, and without synchronization between the backed-up normal channel and the back-up channel.

Advantageously, said backed-up normal channel is the normal channel that has the poorest transmission quality.

Preferably, said interchange step performed in the receive end station consists in copying the multiplexed data from the back-up channel into said backed-up normal channel, only if the transmission quality of the back-up channel is better than that of the backed-up normal channel.

In a particular implementation of the invention, in which said reliable data-transmission is of the type having at least two transmission legs as a result of at least one relay station being used between the transmit end station and the receive end station, each transmission leg being implemented over N normal channel portions, where $N \geq 1$, and over at least one back-up channel portion; and in which each relay station receives data over N incoming normal channel portions, and over at least one incoming back-up channel portion of a preceding transmission leg, and re-transmits the received data over N outgoing normal channel portions and over at least one outgoing back-up channel portion of a following transmission leg;

the method is characterized in that the following successive steps are performed in said relay station:
the multiplexed data from the incoming back-up channel portion is interchanged with the multiplexed data from a "backed-up" one of the N incoming normal channel portions so as to obtain said N outgoing normal channel portions; and
the multiplexed data from a "backed-up" one of the N outgoing normal channel portions is switched to the outgoing back-up channel portion.

In this case, the method of the invention makes leg-by-leg interchange possible while retaining the above-mentioned advantages. Since the payload data and the supervisory data is multiplexed upstream (i.e. put in the form of frames), the interchange is performed leg-by-leg on the streams of frames.

The method of the invention enables a degree of freedom to be gained compared with full-link interchange because the legs are independent from one another. In other words, optimum use is made of all of the legs of the back-up channel, since each portion of the back-up channel enables a portion of any one of the normal channels to be backed up.

Advantageously, said backed-up incoming normal channel portion is the incoming normal channel portion that has the poorest transmission quality, and said backed-up outgoing normal channel portion is the outgoing normal channel portion that has the poorest transmission quality.

Preferably, said interchange step performed in the relay station consists in copying the multiplexed data from the incoming back-up channel portion into said backed-up incoming normal channel portion, only if the transmission quality of the incoming back-up channel portion is better than that of the backed-up incoming normal channel portion.

Preferably, said reliable data-transmission between the transmit end station and the receive end station is radio transmission.

The invention also provides a transmit end station of the above-mentioned type, said transmit end station including:
multiplexing means for multiplexing the traffic data and the supervisory data applied to each of the N pairs of inputs on a respective one of the N normal channels; and
switching means for switching the multiplexed data from a "backed-up" one of the N normal channels to the back-up channel.

In this way, at the transmission end, the multiplexing step precedes the switching step. This enables all of the data (traffic data and supervisory data) to be backed up in one operation.

The invention also provides a receive end station of the above-mentioned type, said receive end station including:
interchange means for interchanging multiplexed data from the back-up channel with multiplexed data from a "backed-up" one of the N normal channels; and
demultiplexing means for demultiplexing traffic data and supervisory data from each of the N normal channels, so as to make the data available on a respective one of said N pairs of outputs.

In this way, at the reception end, the demultiplexing step follows the interchange step.

Finally, the invention also provides a relay station of the above-mentioned type, said relay station including:
interchange means for interchanging the multiplexed data from the incoming back-up channel portion with the multiplexed data from one of the N incoming normal channel portions, so as to obtain said N outgoing normal channel portions; and
switching means for switching multiplexed data from one of the N outgoing normal channel portions to the outgoing back-up channel portion.

In this way, no multiplexing/demultiplexing is necessary in the relay stations.

BRIEF DESCRIPTION OF THE DRAWINGS

Other characteristics and advantages of the invention appear on reading the following description of a preferred implementation of the invention given by way of non-limiting example and with reference to the accompanying drawings, in which.

DETAILED DESCRIPTION OF THE PREFERRED EMBODIMENTS

The invention thus relates to a method of transmitting data reliably over N normal channels, where $N \geq 1$, and over at least one back-up channel, between a transmit end station and a receive end station.

The invention is particularly but not exclusively applicable to radio transmission. Furthermore, it should be noted that the transmission may be both-way, with each end station performing the functions both of transmission and of reception. However, to make the invention easier to understand, in the remainder of the description, only one-way transmission is described between a transmit end station and a receive end station. Clearly, however, the invention is not limited to this type of transmission, and it is also applicable to both-way transmission between two transmit/receive end stations.

Figure 1:
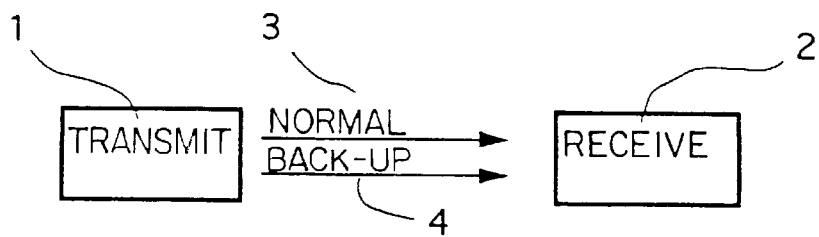
FIG. 1 is a diagram showing a first example of data transmission between a transmit end station and a receive end station, it being possible for said transmission to be made reliable by using a first implementation of the method of the invention.

FIG. 1 is a diagram showing a first implementation of data transmission between a transmit end station 1 and a receive end station 2, over a normal channel 3 and over a back-up channel 4 (transmission of the 1+1 type).

Such transmission, of the single-leg 1+1 type, may be made reliable by using a first implementation of the method of the invention. The first implementation of the method of the invention is described with reference to FIGS. 2, 3, 8, and 9.

Figure 2:
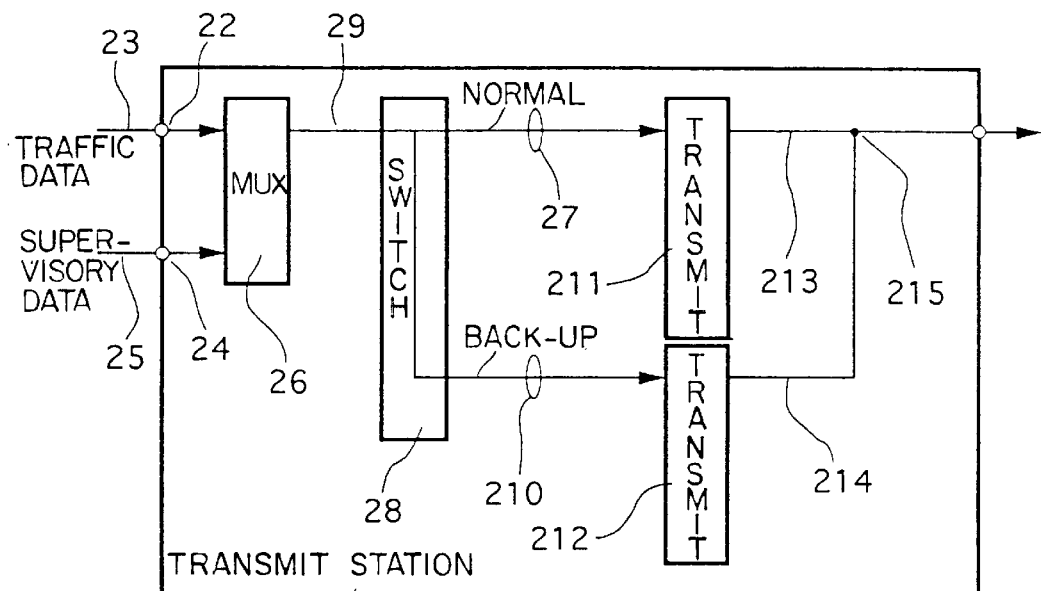
FIGS. 2 and 3 are simplified diagrams respectively showing a first embodiment of a transmit end station and a first embodiment of a receive end station, these first embodiments of end stations enabling the first implementation of the method of the invention to be used.

As shown in FIG. 2, in the first implementation, the transmit end station 21 comprises:

- a pair of inputs comprising an input 22 for traffic data 23 and an input 24 for supervisory data 25;
- multiplexing means 26 for multiplexing, on the normal channel 27, the traffic data 23 and the supervisory data 25 applied to the pair of inputs 22, 24;
- switching means 28 for switching the multiplexed data 29 from the normal channel 27 to the back-up channel 210; and
- transmit means 211, 212 for transmitting the multiplexed data 29 over the normal channel 27 and over the back-up channel.

In this example, the output signals 213, 214 from the transmit means 211, 212 are frequency summed (215).

Figure 8:
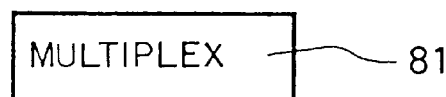
FIGS. 8 and 9 are simplified flow charts showing steps of the method of the invention that are performed respectively in a transmit end station and in a receive end station.

As shown in FIG. 8, in the first implementation, the following successive steps in particular are performed in the transmit end station 21: on the normal channel, the traffic data 23 and the supervisory data 25 applied to the pair of inputs 22, 24 are multiplexed (81); then the multiplexed data 29 is switched (82) from the normal channel 27 to the back-up channel 210.

Figure 3:
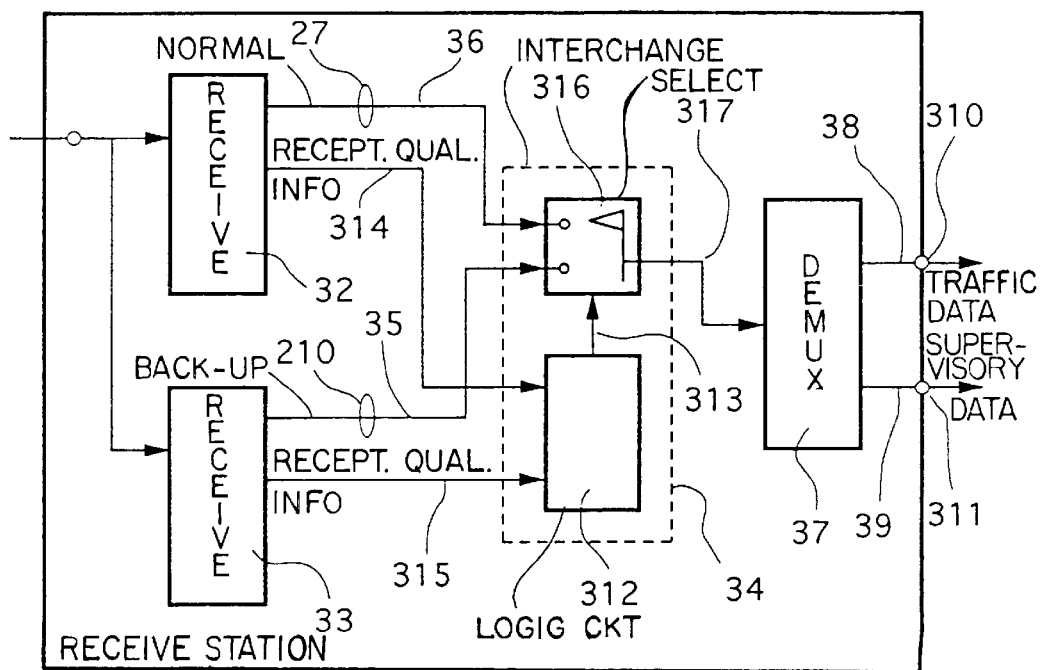

As shown in FIG. 3, in the first implementation, the receive end station 31 comprises:

- receive means 32, 33 for receiving, over the normal channel 27 and over the back-up channel 210, the multiplexed data transmitted by the transmit end station 21;
- interchange means 34 for interchanging the multiplexed data 35 from the back-up channel 210 with the multiplexed data 36 from the normal channel 27;
- demultiplexing means 37 for demultiplexing the multiplexed data 317 present on the normal channel at the output of the interchange means 34 (namely either the multiplexed data 35 from the back-up channel 210, or the multiplexed data 36 from the normal channel 27), so as to separate the traffic data 38 from the supervisory data 39; and
- a pair of outputs comprising an output for the traffic data 38 and an output 311 for the supervisory data 39.

In this implementation, the interchange means 34 comprise:

- a logic circuit 312 for interchange on reception, which circuit generates a channel-select command 313 as a function of information 314, 315 on the reception quality of the normal channel and on that of the back-up channel, which information is supplied by the receive means 32, 33;
- means 316 for selecting the multiplexed data 36 from the normal channel 27 or the multiplexed data 35 from the back-up channel 210, as a function of the channel-select command 313.

Thus, at the output of the selection means 316, the normal channel 27 contains multiplexed data 317 that is either the multiplexed data 36 that it contained before, or the multiplexed data 35 that the back-up channel 210 contained. The logic circuit 312 generates a select command 313 corresponding to that one of the two channels 27, 210 which has the best transmission quality.

Figure 9:
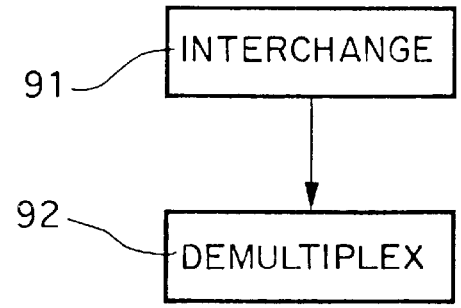

As shown in FIG. 9, in the first implementation, the following successive steps in particular are performed in the receive end station 31: the multiplexed data 35 from the back-up channel 210 is interchanged (91) with the multiplexed data 36 from the normal channel 27; then, on the normal channel 27, the traffic data 38 and the supervisory data 39 is demultiplexed (92) so as to make it available separately at the pair of outputs 310, 311.

Figure 4:
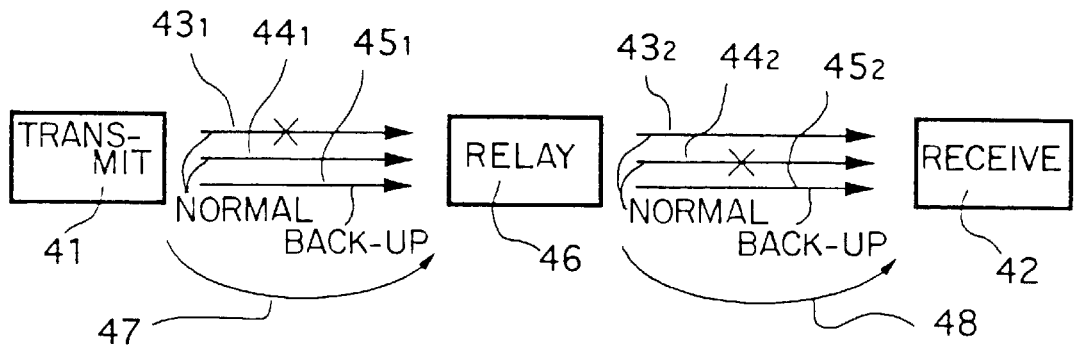
FIG. 4 is a diagram showing a second example of data transmission which is of the multi-leg type and which can be made reliable by using a second implementation of the method of the invention.

FIG. 4 is a diagram showing a second example of data transmission between a transmit end station 41 and a receive end station 42. The second example of data transmission differs from the above-described first example in two ways.

Firstly, the transmission is of the 2+1 type, instead of being of the 1+1 type. The data is transmitted over two normal channels 43, 44 and over one back-up channel 45.

Clearly, the second implementation, described below as applied to transmission of the 2+1 type, may easily be adapted to suit any transmission of the N'+1 type, where $N' \geq 2$.

Furthermore, the transmission is of the multi-leg type instead of being of the single-leg type. The transmit end station 41 is connected to the receive end station 42 via at least one receive/retransmit relay station 46. In general, a transmission leg exists between the transmit end station 41 and a relay station 46, or between two relay stations 46, or else between a relay station 46 and the receive end station 42. Each leg 47, 48 is implemented over N' normal channel portions $43_1$, $44_1$, $43_2$, $44_2$, and over one back-up channel portion $45_1$, $45_2$.

The legs 47, 48 are made reliable independently from one another. Thus, in the example in FIG. 4, on the first leg 47, it is the portion $43_1$ of the first channel 43 that is backed up by the portion $45_1$ of the back-up channel 45, whereas on the second leg 48, it is the portion $44_2$ of the second channel 44 that is backed up by the portion $45_2$ of the back-up channel 45. The backed-up portions $43_1$ and $44_2$ are marked with crosses.

As explained in more detail below, these two distinctive characteristics (N'+1 and multi-leg) have the following effects: the fact that there is more than one normal channel results in the switching means included in the transmit end station 41 being modified, and the fact that there is more than one leg results in there being one or more relay stations 46 (the structure and operation of which are described with reference to FIGS. 7 and 10).

Such multi-leg and N'+1 transmission can be made reliable by using a second implementation of the method of the invention. The second implementation of the method of the invention is described with reference to FIGS. 4 to 10.

Figure 5:
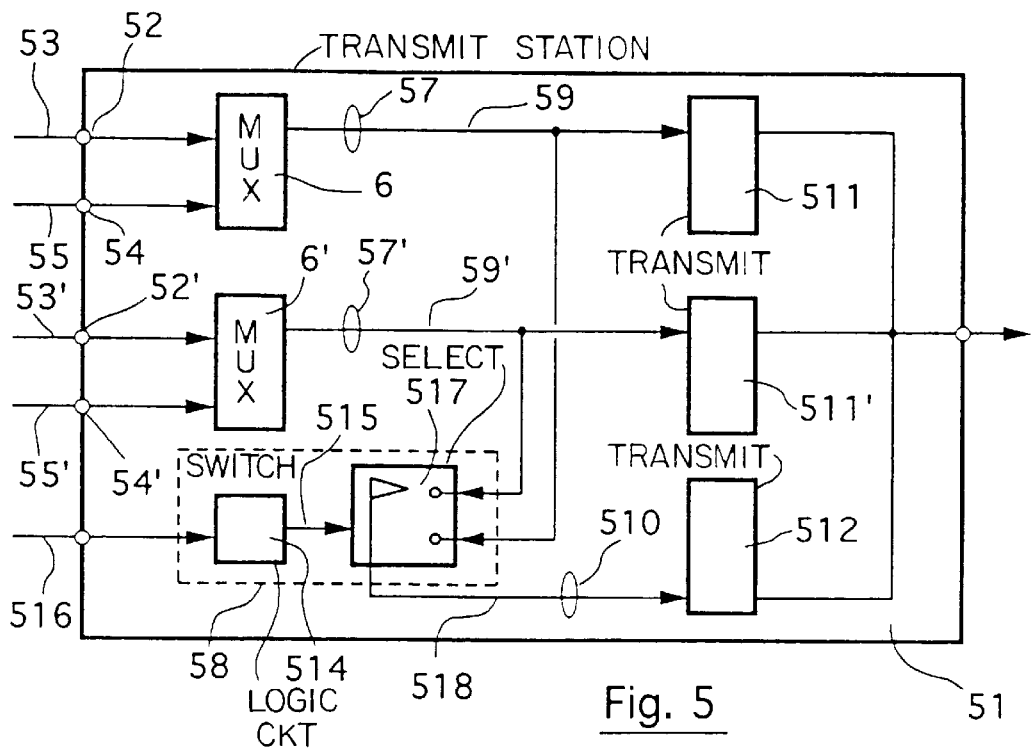
FIGS. 5 and 6 are simplified diagrams respectively showing a second embodiment of a transmit end station and a second embodiment of the a receive end station, these second embodiments of end stations enabling the second implementation of the invention to be used.

As shown in FIG. 5, in the second implementation, the transmit end station 51 comprises:

- two pairs of inputs, each of which pairs comprises an input 52, 52' for traffic data 53, 53', and an input 54, 54' for supervisory data 55, 55';
- multiplexing means 26, 26' for multiplexing on each normal channel 57, 57' the traffic data 53, 53' and the supervisory data 55, 55' applied to a respective one of the pairs of inputs (52, 54), (52', 54');
- switching means 58 for switching the multiplexed data 59, 59' from a "backed-up" one of the normal channels 57, 57' to the back-up channel 510; and
- transmit means 511, 511', 512 for transmitting the multiplexed data 59, 59' over the two normal channels 57, 57' and over the back-up channel 510.

With the second implementation, the following successive steps in particular are performed in the transmit end station (cf FIG. 8): on each normal channel 57, 57', the traffic data 53, 53' and the supervisory data 55, 55' applied to a respective one of the pairs of inputs (52, 54), (52', 54') is multiplexed (81); then the multiplexed data 59, 59' from a "backed-up" one of the normal channels 57, 57' is switched to the back-up channel 510.

In the second implementation, the switching means 58 comprise:

a logic circuit 514 for interchanging on transmission, which circuit generates a channel-select command 515 as a function of information 516 on the transmission quality of the various normal channels 57, 57', which information is supplied by the receive end station (via a return path that is not shown); and means 517 for selecting the multiplexed data 59, 59' from one of the normal channels as a function of the channel select command 515.

Thus, at the output of the switching means 58, the back-up channel 510 contains multiplexed data 518 which is either the multiplexed data 59 from the first normal channel 57, or the multiplexed data 59' from the second normal channel 57. The logic circuit 514 generates a select command 515 corresponding to that one of the two normal channels 57, 57' that has the poorest transmission quality.

Figure 6:
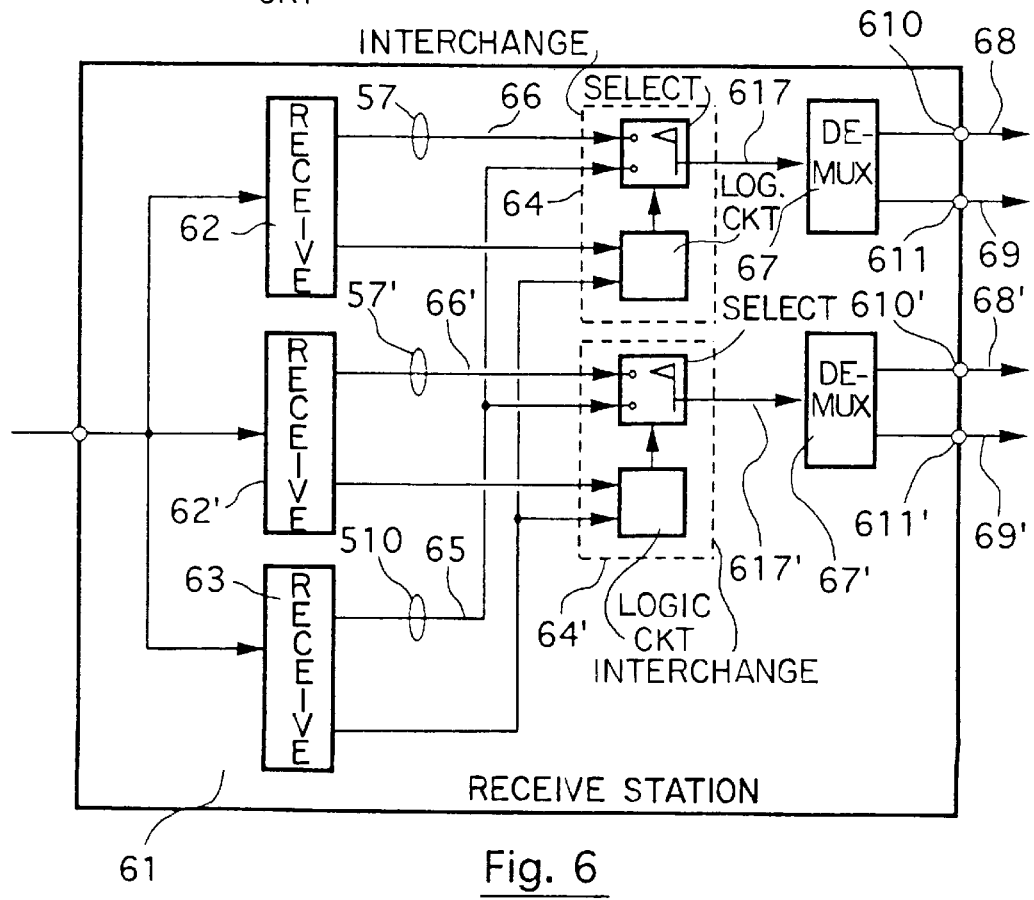

As shown in FIG. 6, in the second implementation, the receive end station 61 comprises:

receive means 62, 62', 63 on each of the normal channels 57, 57' and over the back-up channel 510 for receiving the multiplexed data transmitted by the transmit end station 51;

interchange means 64, 64' on each of the normal channels 57, 57' for interchanging the multiplexed data from the back-up channel 510 with the multiplexed data 66, 66' from the normal channel 57, 57'; the interchange means on one of the normal channels only (namely the backed-up normal channel) are active and actually perform the interchange for which they are provided;

demultiplexing means 67, 67' on each of the normal channels 57, 57' for demultiplexing the multiplexed data 617, 617' present on the normal channel 57, 57' at the output of the interchange means 64, 64' (namely either the multiplexed data 65 from the back-up channel 510, or the multiplexed data 66, 66' from the normal channel 57, 57') so as to separate the traffic data 68, 68' from the supervisory data 69, 69'; and two pairs of outputs, each pair comprising an output 610, 610' for traffic data 68, 68', and an output 611, 611' for supervisory data 69, 69'.

The interchange means 64, 64' on each normal channel 57, 57' are of the type described above with reference to FIG. 3. Thus, after interchange has taken place, each normal channel 57, 57' contains multiplexed data 617, 617' that is either the multiplexed data 66, 66' that it contained prior to the interchange, or the multiplexed data 65 that the back-up channel 510 contained.

With the second implementation, the following successive steps in particular are performed in the receive end station (cf FIG. 9): the multiplexed data 65 from the back-up channel 610 is interchanged (91) with the multiplexed data 66, 66' from the backed-up normal channel 27 or 27'; then, on each of the normal channels 57, 57', the traffic data 68, 68' and the supervisory data 69, 69' is demultiplexed, so as to make it available on the two pairs of outputs (610, 611), (610', 611').

Figure 7:
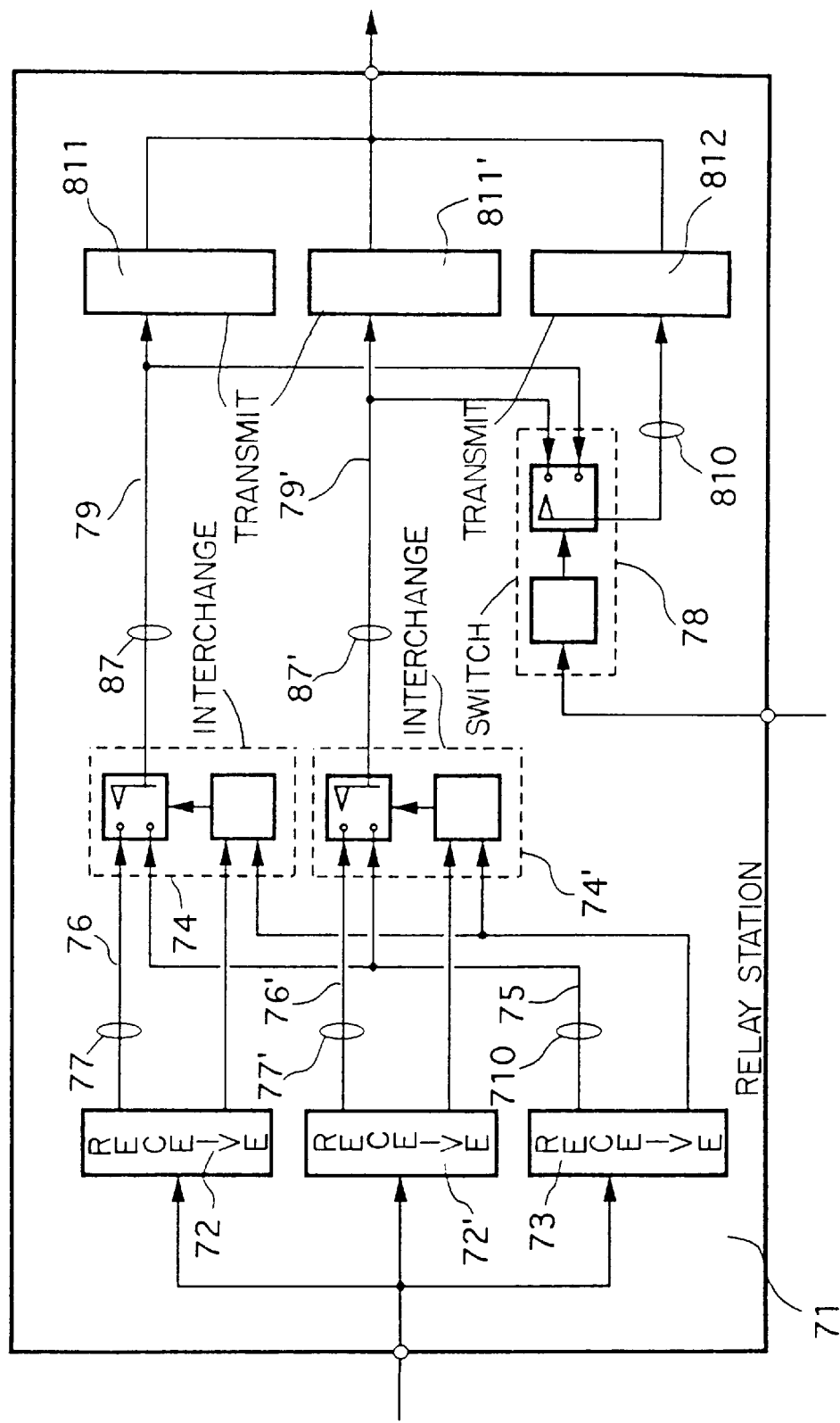
FIG. 7 is a simplified diagram of a particular embodiment of a relay station enabling the second implementation of the method of the invention to be used.

FIG. 7 is a simplified diagram of a particular embodiment of a relay station 71 enabling the second implementation of the method of the invention to be used.

In general, each relay station 71 receives data and re-transmits it. In the described case of 2+1 type multi-leg transmission, each relay station receives data over two incoming normal channel portions 77, 77' and over one incoming back-up channel portion 710 (transmission leg upstream from the relay station). It re-transmits the received data on two outgoing normal channel portions 87, 87' and over an outgoing back-up channel portion 810 (transmission leg downstream from the relay station).

In the embodiment described, the relay station 71 comprises:

receive means 72, 72', 73 on each of the incoming normal channel portions 77, 77' and over the incoming back-up channel portion 710 for receiving the multiplexed data transmitted either by the transmit end station 51 or by another relay station;

interchange means 74, 74' on each of the incoming normal channel portions 77, 77' for interchanging the multiplexed data 75 from the incoming back-up channel portion 710 with the multiplexed data 76, 76' from the incoming normal channel portion 77, 77'; the interchange means on one of the two incoming normal channel portions 77, 77' only (namely those on the backed-up incoming normal channel portion) are active and actually perform the interchange for which they are provided; after the interchange, the two incoming normal channel portions 77, 77' constitute the two outgoing normal channel portions 87, 87'.

means 78 for switching the multiplexed data 79, 79' from a "backed-up" one of the two outgoing normal channel portions 87, 87' to the outgoing back-up channel portion 810; and transmit means 811, 811', 812 on both outgoing normal channel portions 87, 87' and on the outgoing back-up channel portion 810 for transmitting the multiplexed data 79, 79'.

Figure 10:
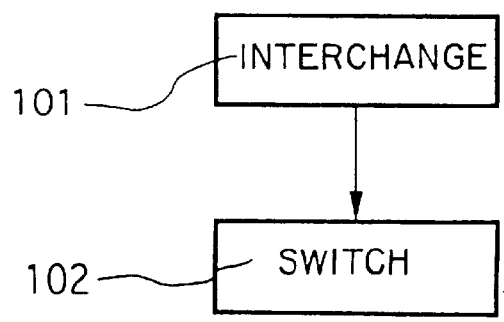
FIG. 10 is a simplified flow chart of steps of the method of the invention that are performed in a relay station.

As shown in FIG. 10, the following successive steps in particular are performed in the relay station 71:

the multiplexed data from the incoming back-up channel portion 75 is interchanged (101) with the multiplexed data 76, 76' from a backed-up one of the two incoming normal channel portions 77, 77', so as to obtain the two outgoing normal channel portions 87, 87'; and the multiplexed data 79, 79' from a "backed-up" one of the two outgoing normal channel portions 87, 87' is switched (102) to the outgoing portion back-up channel 810.

The interchange means 74, 74' are of the same type as those 64, 64' of the receive end station shown in FIG. 6. The switching means 78 are of the same type as those 58 of the transmit end station shown in FIG. 5.

Clearly, numerous other implementations of the method of the invention, and of the transmit end station, of the receive end station, and of the relay station, may be considered without going beyond the ambit of the invention. In particular provision may be made for multi-leg and 1+1 type transmission, or for single-leg and N'+1 type transmission, where N'>1.

We claim:

1. A method of transmitting data reliably over N normal channels, where N≧1, and over at least one back-up channel, between a transmit end station and a receive end station, the data transmitted comprising both traffic data and supervisory data;

said transmit end station being provided with N pairs of inputs, each pair comprising an input for traffic data and an input for supervisory data, the traffic data and the supervisory data applied to the respective inputs of the same pair of inputs being transmitted by the transmit end station over the same normal channel and optionally over the back-up channel;

said receive end station being provided with N pairs of outputs, each pair comprising an output for traffic data and an output for supervisory data, the data available at the respective outputs of the same pair of outputs being traffic data and supervisory data received by the receive end station over the same normal channel and optionally over the back-up channel;

said method being characterized in that the following successive steps are performed in said transmit end station:

the traffic data and the supervisory data applied to each of the N pairs of inputs are multiplexed on a respective one of the N normal channels; and the multiplexed data from a backed-up one of the N normal channels is switched to the back-up channel;

and in that the following successive steps are performed in said receive end station:

the multiplexed data from the back-up channel is interchanged with the multiplexed data from the backed-up normal channel; and the traffic data and the supervisory data on each of the N normal channels are demultiplexed to make the data available at a respective one of said N pairs of outputs.

2. A method according to claim 1, characterized in that said backed-up normal channel is that normal channel that has the poorest transmission quality.

3. A method according to claim 1, characterized in that said interchange step performed in the receive end station comprises copying the multiplexed data from the back-up channel into said backed-up normal channel only if the transmission quality of the back-up channel is better than that of the backed-up normal channel.

4. A method according to claim 1, in which said reliable data-transmission has at least two transmission legs as a result of at least one relay station being used between the transmit end station and the receive end station, each transmission leg being implemented over N normal channel portions, where $N \geq 1$, and over at least one back-up channel portion; and in which each relay station receives data over N incoming normal channel portions, and over at least one incoming back-up channel portion of a preceding transmission leg, and re-transmits the received data over N outgoing normal channel portions and over at least one outgoing back-up channel portion of a following transmission leg;

said method being characterized in that the following successive steps are performed in said relay station:

the multiplexed data from the incoming back-up channel portion is interchanged with the multiplexed data from a backed-up one of the N incoming normal channel portions so as to obtain said N outgoing normal channel portions; and the multiplexed data from a backed-up one of the N outgoing normal channel portions is switched to the outgoing back-up channel portion.

5. A method according to claim 4, characterized in that said backed-up incoming normal channel portion is the incoming normal channel portion that has the poorest transmission quality.

6. A method according to claim 4, characterized in that said backed-up outgoing normal channel portion is that outgoing normal channel portion that has the poorest transmission quality.

7. A method according to claim 4, characterized in that said interchange step performed in the relay station comprises copying the multiplexed data from the incoming back-up channel portion into said backed-up incoming normal channel portion only if the transmission quality of the incoming back-up channel portion is better than that of the backed-up incoming normal channel portion.

8. A method according to claim 1 characterized in that said reliable data-transmission between the transmit end station and the receive end station is radio transmission.

9. A transmit end station designed to co-operate with a receive end station for transmitting data reliably over N normal channels, where $N \geq 1$, and over at least one back-up channel, the data transmitted comprising both traffic data and supervisory data;

said transmit end station being provided with N pairs of inputs, each pair comprising a traffic data input and a supervisory data input, the traffic data and the supervisory data applied to the respective inputs of the same pair of inputs being transmitted by the transmit end station over the same normal channel and optionally over the back-up channel;

said transmit end station comprising:

a multiplexer multiplexing the traffic data and the supervisory data applied to each of the N pairs of inputs on a respective one of the N normal channels; and a switch switching the multiplexed data from a backed-up one of the N normal channels to the back-up channel.

10. A receive end station designed to co-operate with a transmit end station for receiving data reliably over N normal channels, where $N \geq 1$, and over at least one back-up channel, the data received comprising both traffic data and supervisory data;

said receive end station being provided with N pairs of outputs, each pair comprising a traffic data output and a supervisory data output, the data available at the respective outputs of the same pair of outputs being traffic data and supervisory data received by the receive end station over the same normal channel and optionally over the back-up channel;

said receive end station comprising:

an interchanger interchanging multiplexed data from the back-up channel with multiplexed data from a backed-up one of the N normal channels; and a demultiplexer demultiplexing the traffic data and the supervisory data from each of the N normal channels, to make the data available on a respective one of said N pairs of outputs.

11. A relay station enabling reliable data-transmission, said relay station having at least two transmission legs, each transmission leg being implemented over N normal channel portions, where N≧1, and over at least one back-up channel portion;

said relay station receiving the data over N incoming normal channel portions and over at least one incoming back-up channel portion of a preceding transmission leg, and re-transmitting the received data over N outgoing normal channel portions and over at least one outgoing back-up channel portion of a following transmission leg;

said relay station comprising:

an interchanger interchanging multiplexed data from the incoming back-up channel portion with the multiplexed data from one of the N incoming normal channel portions, so as to obtain said N outgoing normal channel portions; and a switch switching multiplexed data from one of the N outgoing normal channel portions to the outgoing back-up channel portion.

\* \* \* \* \*